(12) United States Patent
Franceschini et al.

(10) Patent No.: US 10,725,170 B2
(45) Date of Patent: Jul. 28, 2020

(54) FREQUENCY MODULATED CONTINUOUS WAVE RADIO ALTIMETER SPECTRAL MONITORING

(71) Applicant: Honeywell International Inc., Morris Plains, NJ (US)

(72) Inventors: Michael R. Franceschini, Centerport, NY (US); Kelly P. Muldoon, Golden Valley, MN (US); Steven L. Timm, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 893 days.

(21) Appl. No.: 14/972,880

(22) Filed: Dec. 17, 2015

(65) Prior Publication Data

US 2017/0176588 A1 Jun. 22, 2017

(51) Int. Cl.
*G01S 13/88* (2006.01)
*G01S 7/02* (2006.01)
(Continued)

(52) U.S. Cl.
CPC ............ *G01S 13/882* (2013.01); *G01S 7/021* (2013.01); *G01S 7/352* (2013.01); *H04W 4/70* (2018.02);
(Continued)

(58) Field of Classification Search
CPC ........ G01S 11/14; G01S 15/60; G01S 13/882; G01S 13/34; G01S 13/345; G01S 13/343;
(Continued)

(56) References Cited

U.S. PATENT DOCUMENTS 3,742,498 A 6/1973 Dunn
4,359,733 A 11/1982 O'Neill
(Continued)

FOREIGN PATENT DOCUMENTS

EP 0816866 1/1998
EP 1835668 9/2007
(Continued)

OTHER PUBLICATIONS

European Patent Office, "Extended European Search Report from EP Application No. 16203907.7 dated Apr. 18, 2017", "from Foreign Counterpart of U.S. Appl. No. 14/972,925", dated Apr. 18, 2017, pp. 1-6, Published in: EP.
(Continued)

*Primary Examiner* — Olumide Ajibade Akonai
(74) *Attorney, Agent, or Firm* — Bookoff McAndrews, PLLC

(57) ABSTRACT

In one embodiment, a radio altimeter tracking filter is provided. The filter comprises: a wireless radio interface; a processor coupled to the wireless radio interface; a memory coupled to the wireless radio interface; wherein the wireless radio interface is configured to wirelessly receive a radio altimeter signal and convert the radio altimeter signal to a baseband frequency signal, wherein the a radio altimeter signal sweeps across a first frequency spectrum between a first frequency and a second frequency; wherein the processor is configured to pass the baseband frequency signal through a filter executed by the processor, the filter comprising a passband having a first bandwidth, and wherein the filter outputs a plurality of spectral chirps in response to the baseband frequency signal passing through the first bandwidth; wherein the processor is configured to process the plurality of spectral chirps to output characteristic parameters that characterize the radio altimeter signal.

20 Claims, 6 Drawing Sheets

(51) Int. Cl.
*H04W 4/70* (2018.01)
*G01S 7/35* (2006.01)
*G01C 5/00* (2006.01)

(52) U.S. Cl.
CPC ........ *G01C 5/005* (2013.01); *G01S 2007/358* (2013.01)

(58) Field of Classification Search
CPC ................. G01S 13/347; G01S 13/583; G01S 2007/358; G01S 7/4056; G01S 1/02; G01S 13/106; G01S 13/2007; G01S 13/358; G01C 5/005; H04J 3/1694
See application file for complete search history.

(56) References Cited

U.S. PATENT DOCUMENTS

| | | | |
|---|---|---|---|
| 4,427,981 A | 1/1984 | Kyriakos | |
| 5,142,533 A | 8/1992 | Crisler et al. | |
| 5,477,226 A * | 12/1995 | Hager | G01S 13/34 342/120 |
| 5,574,979 A | 11/1996 | West | |
| 5,909,433 A | 6/1999 | Haartsen | |
| 5,999,118 A | 12/1999 | Hethuin | |
| 6,314,366 B1 | 11/2001 | Farmakis et al. | |
| 6,377,565 B1 | 4/2002 | Puckette, IV | |
| 6,801,951 B1 | 10/2004 | Roden, III | |
| 6,850,553 B1 | 2/2005 | Waschka et al. | |
| 6,941,110 B2 | 9/2005 | Kloper et al. | |
| 6,977,611 B1 * | 12/2005 | Crabb | G01S 7/021 342/122 |
| 7,069,076 B2 | 6/2006 | Hedberg et al. | |
| 7,440,427 B1 | 10/2008 | Katz | |
| 7,561,591 B2 | 7/2009 | Hiraoka et al. | |
| 7,634,275 B2 | 12/2009 | Odman | |
| 7,683,827 B2 | 3/2010 | Kelly, Jr. et al. | |
| 7,873,739 B2 | 1/2011 | Hall et al. | |
| 8,188,911 B2 | 5/2012 | Beasley | |
| 8,908,573 B1 | 12/2014 | Wang et al. | |
| 9,065,645 B2 | 6/2015 | Yang et al. | |
| 2002/0072853 A1 | 6/2002 | Sullivan | |
| 2002/0114303 A1 | 8/2002 | Crosbie et al. | |
| 2003/0035173 A1 | 2/2003 | Byers et al. | |
| 2005/0090201 A1 | 4/2005 | Lengies et al. | |
| 2005/0179583 A1 | 8/2005 | Jordan et al. | |
| 2005/0182530 A1 | 8/2005 | Murphy | |
| 2006/0049977 A1 * | 3/2006 | Vacanti | G01S 7/006 342/121 |
| 2006/0109831 A1 | 5/2006 | Tillotson | |
| 2006/0114862 A1 | 6/2006 | Hiraoka | |
| 2006/0172705 A1 | 8/2006 | Parthasarathy et al. | |
| 2007/0268819 A1 | 11/2007 | Johansson et al. | |
| 2007/0268884 A1 | 11/2007 | Kolavennu et al. | |
| 2008/0051948 A1 * | 2/2008 | Petrich | G01C 5/005 701/4 |
| 2009/0083606 A1 | 3/2009 | Choi et al. | |
| 2009/0097468 A1 | 4/2009 | Yi et al. | |
| 2009/0116461 A1 | 5/2009 | Yonge, III et al. | |
| 2009/0174594 A1 | 7/2009 | Thomas et al. | |
| 2009/0289834 A1 * | 11/2009 | Devensky | G01S 13/34 342/122 |
| 2010/0085236 A1 | 4/2010 | Franceschini et al. | |
| 2010/0142590 A1 | 6/2010 | Hohne et al. | |
| 2011/0013526 A1 | 1/2011 | Mosko | |
| 2012/0026941 A1 | 2/2012 | Ahmad et al. | |
| 2012/0188998 A1 | 7/2012 | Philips et al. | |
| 2013/0051381 A1 | 2/2013 | Bracha | |
| 2013/0128927 A1 | 5/2013 | Yucek et al. | |
| 2013/0155748 A1 * | 6/2013 | Sundstrom | H04B 1/0032 363/157 |
| 2013/0170505 A1 | 7/2013 | Nemeth et al. | |
| 2013/0230035 A1 | 9/2013 | Grandhi et al. | |
| 2014/0105194 A1 | 4/2014 | Wiatrowski et al. | |
| 2014/0348140 A1 | 11/2014 | Atkinson | |
| 2015/0003468 A1 | 1/2015 | Thubert et al. | |
| 2015/0078297 A1 | 3/2015 | Zheng | |
| 2015/0092642 A1 | 4/2015 | Geboff et al. | |
| 2015/0110004 A1 | 4/2015 | Katz | |
| 2015/0229133 A1 | 8/2015 | Reynolds et al. | |
| 2015/0365155 A1 | 12/2015 | Subramanian et al. | |
| 2015/0382171 A1 | 12/2015 | Roy et al. | |
| 2016/0029409 A1 | 1/2016 | Mueller et al. | |
| 2016/0277161 A1 * | 9/2016 | Haque | H04L 5/0007 |
| 2017/0171088 A1 | 6/2017 | Shor et al. | |
| 2017/0176588 A1 | 6/2017 | Franceschini et al. | |
| 2017/0180040 A1 | 6/2017 | Wang et al. | |
| 2017/0180072 A1 | 6/2017 | Timm et al. | |
| 2017/0181146 A1 | 6/2017 | Franceschini et al. | |
| 2017/0230916 A1 | 8/2017 | Stein et al. | |

FOREIGN PATENT DOCUMENTS

| | | | |
|---|---|---|---|
| EP | 1930743 | 6/2008 | |
| EP | 1930743 A1 * | 6/2008 | ............. G01S 13/32 |
| WO | 9605562 | 2/1996 | |
| WO | 0199300 | 12/2001 | |
| WO | 03001742 | 1/2003 | |
| WO | 2014078811 | 5/2014 | |
| WO | 2016054440 | 4/2016 | |
| WO | 2016142837 | 9/2016 | |

OTHER PUBLICATIONS

European Patent Office, "Extended European Search Report from EP Application No. 16199899.2 dated May 10, 2017", "from Foreign Counterpart of U.S. Appl. No. 14/972,880", dated May 10, 2017, pp. 1-9, Published in: EP.

European Patent Office, "Extended European Search Report from EP Application No. 16199897.6 dated May 11, 2017", "from Foreign Counterpart of U.S. Appl. No. 14/972,898", dated May 11, 2017, pp. 1-6, Published in: EP.

2nd Meeting CPG PTC, London, Apr. 16-19, 2013, "Subject: Proposed Updates to the Working Documents Towards a Preliminary Draft New Report M [WAIC Bands]", "Consideration of the Aeronautical mobile (route), aeronautical mobile, and aeronautical radionavigation services allocations to accommodate wireless avionics intra-communications (WAIC)", Date Issued: Apr. 8, 2013, pp. 1-20, Publisher European Conference of Postal and Telecommuncations Administrations (CEPT), Source: Germany.

United States Patent and Trademark Office, "Office Action", "From U.S. Appl. No. 14/972,898", dated Jun. 16, 2017, pp. 1-67, Published in: US.

"4200-4400 MHz", Mar. 1, 2014, pp. 1-9, Publisher: National Telecommunications and Information Administration, Published in: US.

Mahmood et al., "Time Synchronization Accuracy in Real-Time Wireless Sensor Networks", "Proceedings of the 2009 IEEE 9th Malaysia International Conference on Communications", Dec. 15-17, 2009, pp. 652-657, Published in: Kuala Lumpur Malaysia.

United States Patent and Trademark Office, "Notice of Allowance", "From U.S. Appl. No. 14/972,925", dated Sep. 5, 2017, pp. 1-31, Published in: US.

U.S. Patent and Trademark Office, "Notice of Allowability", "U.S. Appl. No. 14/972,925", dated Nov. 14, 2017, pp. 1-6, Published in: US.

U.S. Patent and Trademark Office, "Final Office Action", "U.S. Appl. No. 14/972,898", dated Oct. 19, 2017, pp. 1-59, Published in: US.

US Patent and Trademark Office, "Advisory Action", "U.S. Appl. No. 14/972,898", dated Dec. 21, 2017, pp. 1-6, Published in: US.

United States Patent and Trademark Office, "Office Action for U.S. Appl. No. 14/972,898", dated Mar. 1, 2018, pp. 1-46, Published in: US.

Timm et al., "Systems and Methods to Syncronize Wireless Devices in the Presence of a FMCW Radio Altimeter", "U.S. Appl. No. 14/972,898, filed Dec. 17, 2015", Dec. 17, 2015, pp. 1-27, Published in: US.

(56) References Cited

OTHER PUBLICATIONS

Franceschini et al., "Cognitive Allocation of TDMA Resources in the Presence of a Radio Altimeter", "U.S. Appl. No. 14/972,925, filed Dec. 17, 2015", Dec. 17, 2015, pp. 1-30, Published in: US.
"Characteristics of WAIC systems and bandwidth requirements to support their safe operation", "Radiocommunication Study Groups", Dec. 2012, pp. 1-71, Publisher: International Telecommunication Union.
Bluemm et al., "Wireless Aircraft Cabin Communication—An ISM-Band Cognitive Radio Approach", "8th Karlsruhe Workshop on Software Radio", 2014, pp. 127-135.
"Technical characteristics and spectrum requirements of Wireless Avionics Intra-Communications systems to support their safe operation", "M Series Mobile, radiodeteremination, amateur and related satellite services", Dec. 2013, pp. 1-76, Publisher: International Telecommunication Union.
"Technical characteristics and operational objectives for wireless avionics intra-communications (WAIC)", "M Series Mobile, radiodetermination, amateur and related satellites services", Nov. 2010, pp. i-56, Publisher: International Telecommunication Union.
"Wireless Avionics Intra-Communications (WAIC) an Overview and Application Examples", 2011.
"WAIC Wireless Avionics Intra-Communications", Dec. 9, 2011, pp. 1-2, Publisher: Aerospace Vehicle Systems Institute.
Wattenhofer, "Clock Synchronization", "Ad Hoc and Sensor Networks", Nov. 16, 2009, pp. 1-11.
"Beacon frame", "downloaded from Wikipedia Jul. 20, 2015", Jul. 20, 2015, pp. 1-3.
"European Common Proposals for the Work of the Conference", "World Radiocommunication Conference (WRC-15) dowloaded from internet on Jul. 20, 2015", pp. 1-3.

\* cited by examiner

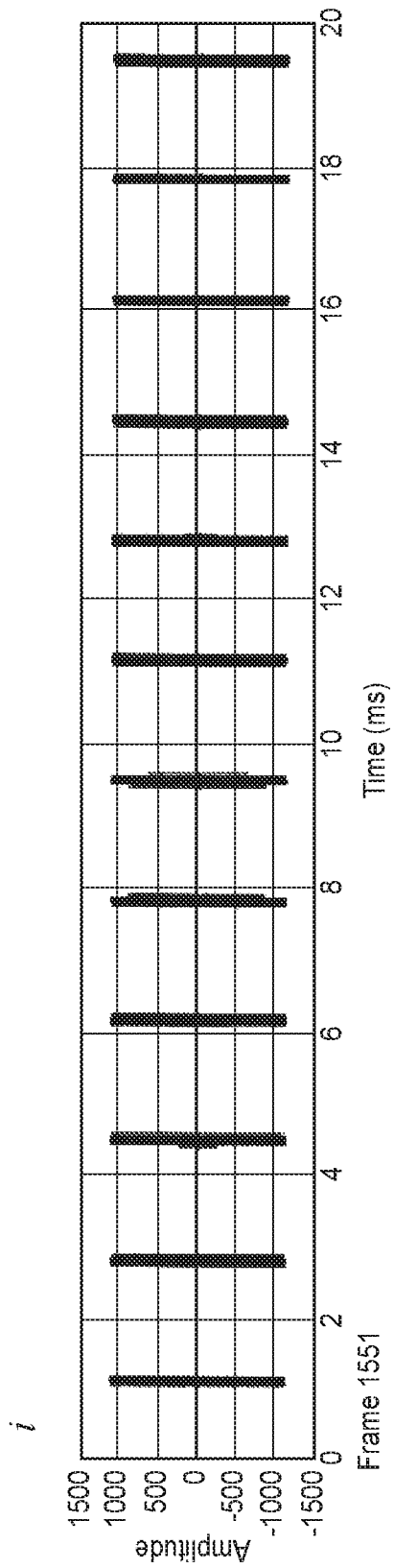
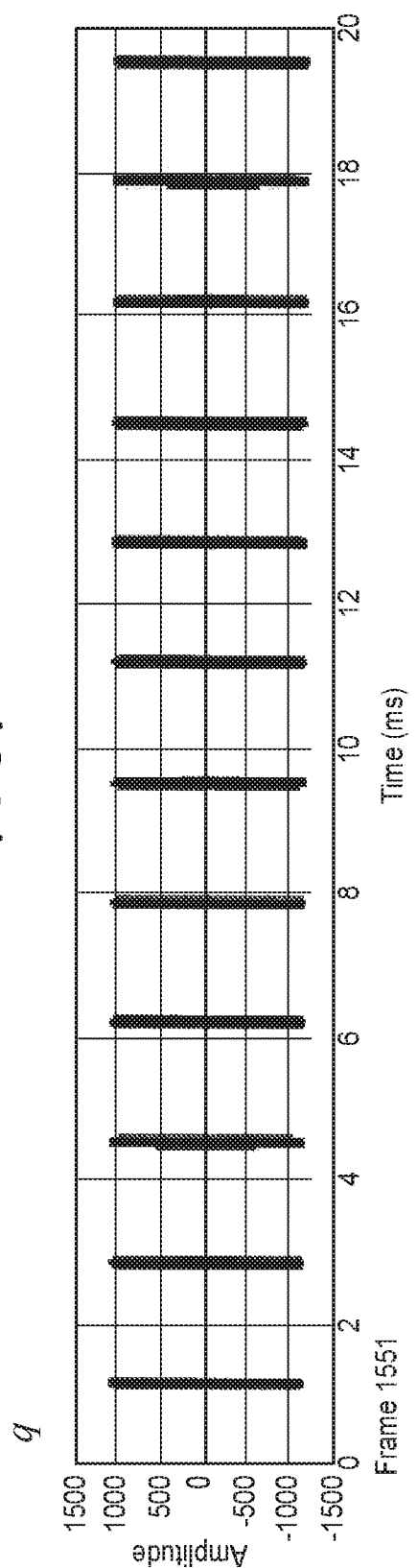
FIG. 2A
FIG. 2B

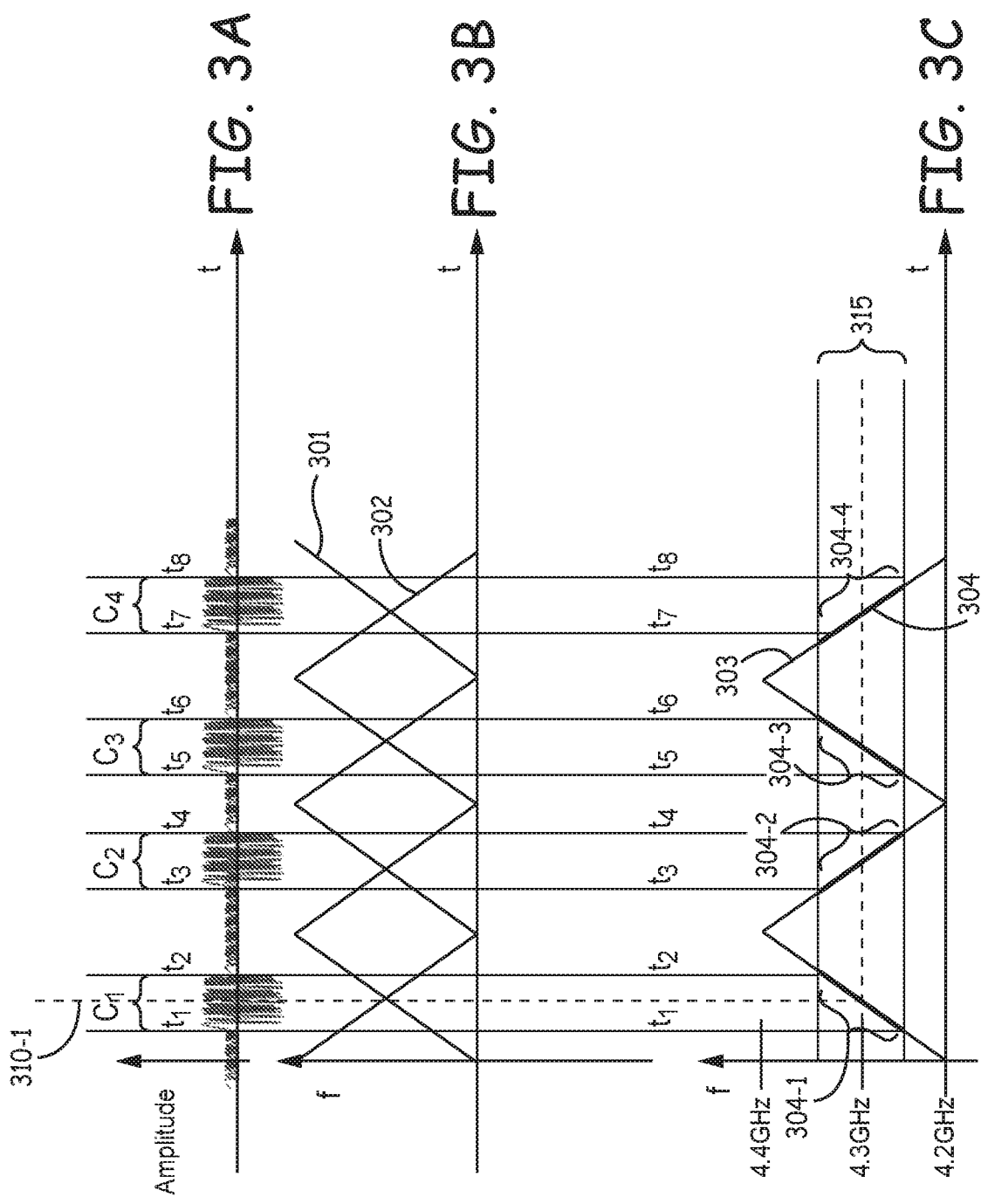

FREQUENCY MODULATED CONTINUOUS WAVE RADIO ALTIMETER SPECTRAL MONITORING

CROSS-REFERENCE TO RELATED APPLICATION

This application is related to: U.S. patent application Ser. No. 14/972,925 entitled "COGNITIVE ALLOCATION OF TDMA RESOURCES IN THE PRESENCE OF A RADIO ALTIMETER" filed on even date herewith and U.S. patent application Ser. No. 14/972,898 entitled "SYSTEMS AND METHODS TO SYNCHRONIZE WIRELESS DEVICES IN THE PRESENCE OF A FMCW RADIO ALTIMETER" filed on even date herewith, both of which are incorporated herein by reference in their entirety.

BACKGROUND

Conventional aircraft communication systems including operational communications systems onboard the aircraft, sensors for engines, landing gear and proximity to nearby objects such as vehicles and other aircraft require complex electrical wiring and harness fabrication, which adds weight to the aircraft and in turn increases fuel costs. Further, these systems are unreliable and difficult to reconfigure, and rely on double or triple redundancy to mitigate the risk of cut or defective wiring.

The risk of cut or defective wiring can be reduced with the use of wireless connectivity for wireless avionics devices. However, in many cases the spectrum to be used by the wireless avionics system is already in use by a Radio Altimeter (RA) system as the frequency modulated continuous wave (FMCW) radio altimeter signal sweeps the spectrum.

For the reasons stated above and for other reasons stated below, it will become apparent to those skilled in the art upon reading and understanding the specification, there is a need in the art for monitoring the signal and determining the parameters necessary to detect the available spectrum for establishing wireless connectivity in the wireless avionics system.

SUMMARY

The Embodiments of the present disclosure provide systems and methods for using a radio altimeter tracking filter to monitor radio altimeter spectrum in an avionics system by reconstruction of the wave created by radio altimeter (RA) frequency modulated continuous wave (FMCW) signal.

In one embodiment, a radio altimeter tracking filter comprises: a wireless radio interface; a processor coupled to the wireless radio interface; a memory coupled to the wireless radio interface; wherein the wireless radio interface is configured to wirelessly receive a radio altimeter signal and convert the radio altimeter signal to a baseband frequency signal, wherein the a radio altimeter signal sweeps across a first frequency spectrum between a first frequency and a second frequency; wherein the processor is configured to pass the baseband frequency signal through a filter executed by the processor, the filter comprising a passband having a first bandwidth, and wherein the filter outputs a plurality of spectral chirps in response to the baseband frequency signal passing through the first bandwidth; wherein the processor is configured to process the plurality of spectral chirps to output characteristic parameters that characterize the radio altimeter signal.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A and 2B is a graphical representation of spectral chirps caused by the RA FMCW signal of one embodiment of the present disclosure;

FIG. 3A is a magnified view of an example of spectral chirps of a down converted RA FMCW signal of one embodiment of the present disclosure;

FIG. 3B is a graphical representation of ambiguity in slope determination of a down converted RA FMCW signal of one embodiment of the present disclosure.

FIG. 3C is a graphical representation of an example of reconstructed wave created by the RA FMCW signal of one embodiment of the present disclosure;

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. These embodiments are described in sufficient detail to enable those skilled in the art to practice the invention, and it is to be understood that other embodiments may be utilized and that logical, mechanical, and electrical changes may be made. The following detailed description is, therefore, not to be taken in a limiting sense.

Embodiments of the present disclosure provide systems and methods for monitoring radio altimeter spectrum in an avionics system by reconstruction of the wave created by radio altimeter (RA) frequency modulated continuous wave (FMCW) signal. This wave can be reconstructed by determining the slope and the period of the FMCW from the chirps caused by the RA FMCW signal sweeping through filter bandwidth. Further, the embodiments of the present disclosure resolve the ambiguity in the magnitude of the slope of such an FMCW signal.

Once the parameters of this wave are determined, these parameters can be used by various communication systems to communicate over the bandwidth allocated to the radio altimeter. In one example, these parameters can be used by a wireless avionics system utilizing a time division multiple access (TDMA) scheme. In such a system, the wireless avionics system uses the parameters to reconstruct the FMCW signal and allocate time slots and frequency of the TDMA signal to avoid interference with the RA signal.

Figure 1:
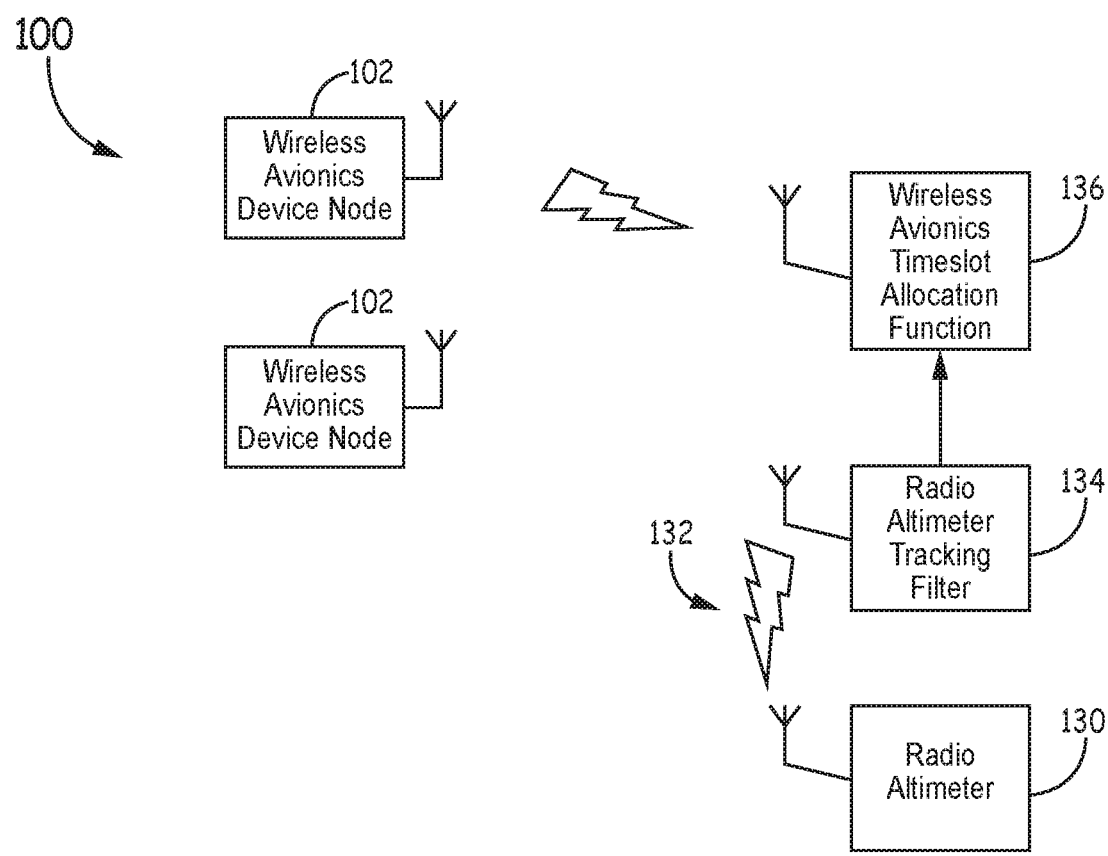
FIG. 1 is a high level block diagram of one embodiment of an exemplary avionics system 100.

FIG. 1 is a block diagram illustrating a wireless device network 100 of one embodiment of the present disclosure. In some implementations, wireless device network 100 may comprise a wireless avionics network. It should be understood that the systems and methods of the present disclosure are applicable to any network using a wireless communications protocol that needs to avoid a signal that periodically sweeps a bandwidth.

System 100 includes a plurality of device nodes 102 (also referred to herein as wireless avionics device nodes 110), one or more of which comprise wireless avionics sensors. Wireless avionics devices 110 share a radio frequency spectrum using TDMA where each device 102 is granted access to transmit over an RF channel during a specified timeslot allocated to them by a Wireless Avionics Timeslot Allocation Function 136. In one embodiment, each frame comprises 2000 timeslots and each 2000 timeslot frame has a duration of one second.

Wireless device network 100 further comprises a Wireless Avionics Timeslot Allocation Function 136 that is aware of the sweeping radio altimeter signal 132 produced by the on-board radio altimeter 130 and allocates time slots to wireless avionics device nodes that will avoid transmitting on frequencies currently occupied by radio altimeter signal 132. Wireless Avionics Timeslot Allocation Function 136 is coupled to a Radio Altimeter Tracking Filter 134 that receives the radio altimeter signal 132 and characterizes the signal 132 into descriptive parameters (discussed below) used by Wireless Avionics Timeslot Allocation Function 136 to predictively determine which wireless avionics channels are available during which timeslots, and which wireless avionics channels are to be avoided during which timeslots. In one embodiment, Radio Altimeter Tracking Filter 134 characterizes the radio altimeter signal 132 transmitted by the aircraft's radio altimeter 130 and characterizes the signal 132 by determining parameters such as the current amplitude and period of the radio altimeter signal pattern, for example. In exemplary embodiments, the signal 132 is a triangle wave, a square wave, or another suitable wave for a radio altimeter known to one having skill in the art.

Allocation of timeslots to wireless avionics devices 110 is the subject of U.S. patent application Ser. No. 14/972,925 which is incorporated herein by reference. In short, Wireless Avionics Timeslot Allocation Function 136 is provided by Radio Altimeter Tracking Filter 134 inputs including the current amplitude and period of the radio altimeter 130 signal pattern as well as the current frequency and/or channels occupied by the radio altimeter signal 132. Using this data from Radio Altimeter Tracking Filter 134, Wireless Avionics Timeslot Allocation Function 136 allocates timeslots to each of the wireless avionics devices 110 which are calculated not to conflict with the radio altimeter signal 132.

In this example, the radio altimeter 130 is allocated a spectrum of 4200 MHz-4400 MHz. However, the radio altimeter 106 may only utilize a portion of the allocated spectrum. For example, the radio altimeter 130 may only utilize a span of 4235 MHz-4365 MHz. It is to be understood that other frequency spectra can be allocated for use by the radio altimeter 106 in other embodiments. Similarly, the radio altimeter 130 may utilize other portions of the allocated spectrum in other embodiments. The radio altimeter signal 132 interacts with the ground or surface beneath the aircraft and part of the incident signal tone reflects back to the radio altimeter 130. By measuring the amount of time it takes to receive the reflection, the radio altimeter 130 is able to determine the altitude of the aircraft on which the wireless avionics system 100 is located. Operation of a radio altimeter 130 is known to one of skill in the art and not discussed in more detail herein.

The radio altimeter signal 132 is swept through the frequency spectrum allocated for the operation of the wireless avionics system 100. Because the signal 132 is sweeping, the radio altimeter 130 is only using a portion of the allocated spectrum shared with wireless avionics system 100 at a given point in time. The Radio Altimeter Tracking Filter 134 is configured to track characteristics of the radio altimeter signal 132. In particular, the Radio Altimeter Tracking Filter 134 tracks the periodicity, sweep rate, and the amplitude of the signal tone of the radio altimeter during the present frame of communication. The Radio Altimeter Tracking Filter 134 is also configured to predict these values into the future. In exemplary embodiments, the Radio Altimeter Tracking Filter 134 predicts the frequency of the radio altimeter signal into the future using the following equation:

$$\text{Frequency} = \left(\frac{d}{p}\right) * (P - \text{abs}(t \ \%(2*P) - P)) \qquad (1)$$

where: A is the amplitude, P is the period of the sweep, and t is time. In particular, the Radio Altimeter Tracking Filter 134 predicts the frequency of the signal 132 of the radio altimeter for the next frame of communication during the present frame of communication. For example, in one embodiment, during frame 1, the Radio Altimeter Tracking Filter 134 predicts the frequency of the radio altimeter signal 132 for all points in time in frame 2. In other exemplary embodiments, the Radio Altimeter Tracking Filter 134 predicts the frequency of the signal further into the future. The amount of time into the future that the module can predict is limited by the accuracy of the prediction. Since the radio altimeter and the wireless device system may both be critical to flight safety, interference cannot occur between the radio altimeter signal 132 and the TDMA signals transmitted by the wireless avionics device nodes 102.

The Radio Altimeter Tracking Filter 134 provides the predicted frequency of the radio altimeter signal tone to the Timeslot Allocation Function 136. Based on the predicted frequency of the radio altimeter signal tone, the Timeslot Allocation Function 136 is configured to allocate time slots on a TDMA basis to the wireless avionics device nodes 102 in the unused portion of the frequency spectrum not currently in use by the radio altimeter 106 and to prevent transmission over particular channels at time slots when they correspond to the frequency of the radio altimeter signal tone 132. In other words, the Timeslot Allocation Function 136 is configured to allocate time slots and frequencies of the TDMA signals so the TDMA signals do not overlap with the frequency of the signal 132 from the radio altimeter 130.

Figure 1A:
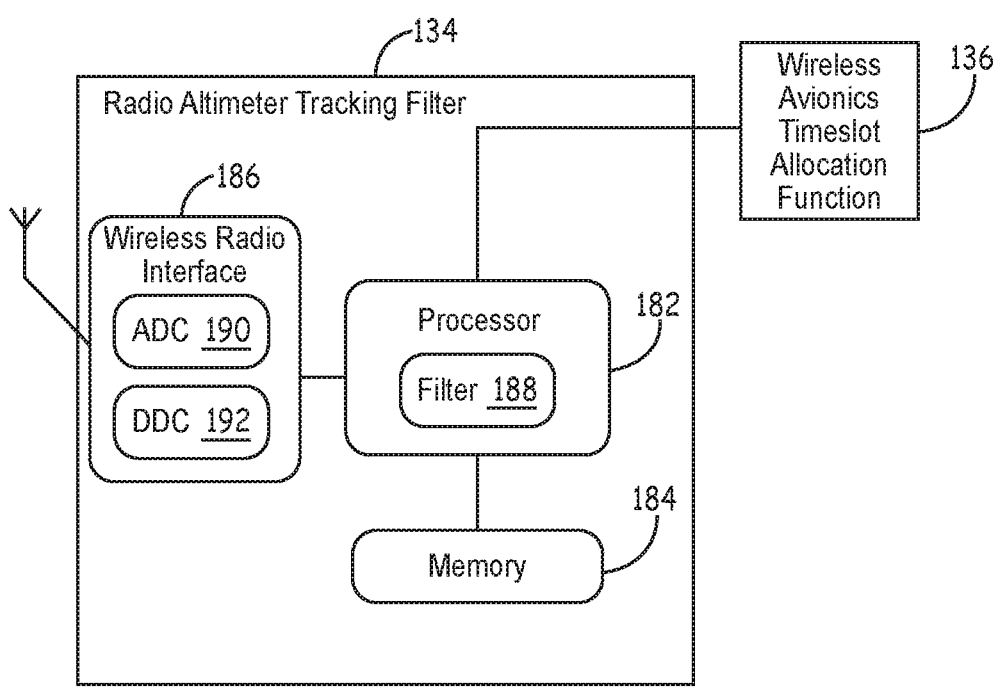
FIG. 1A is a block diagram of an example radio altimeter tracking filter included in one embodiment of the present disclosure.

FIG. 1A is a diagram illustrating one implementation of Radio Altimeter Tracking Filter 134 comprises a wireless radio interface 186 coupled to a processor 182 and memory 184. Memory 184 may be an internal memory and comprised within processor 182. In some examples, memory 184 may be an external memory coupled to processor 182. In this implementation, Radio Altimeter Tracking Filter 134 utilizes a direct conversion to baseband approach to detect the radio altimeter signal 132. Accordingly, in one embodiment, wireless radio interface 186 comprises a receiver, or transceiver that is able to operate over the spectrum swept by radio altimeter signal 132. For example, in one implementation, wireless radio interface 186 comprises an RF Agile Transceiver capable of operating in the Aeronautical Radio Navigation Band (4.2.-4.4 GHz) with which radio altimeter signal 132 is digitally sampled (using analog to digital converter 190, for example) and down converted to a baseband frequency (using digital down converter 192, for example). The result is processed by processor 182 to detect the spectral chirps in the sweeping radio altimeter signal 132.

In one embodiment, wireless radio interface 186 receives signal 132 and is configured to sample, filter and process the down converted in-phase (I-signal) and quadrature (Q-signal) to detect the spectral chirps. Alternatively, in some embodiments, A/D converter 190 is configured to sample the received signal 132 and convert the signal from analog to digital, digital down converter 192 filters the sampled signal to output baseband in-phase (I) and quadrature phase (Q) component signals, and a processor 182 that processes the I and the Q signal components to detect the spectral chirps caused by signal 132 sweeping through the allocated frequency spectrum. The slope, period or other characteristic parameters of the radio altimeter signal 132 can be computed from the spectral chirps detected at baseband. In one embodiment, these parameters are then communicated to one or more avionics components coupled to the Radio Altimeter Tracking Filter 134 (such as, but not limited to, the Wireless Avionics Timeslot Allocation Function 134, for example). In one embodiment, the characteristic parameters are stored in a memory 184 and can be accessed by one or more avionics component at a later time.

Network 100 further includes a filter that has a passband falling (filter bandwidth) within the frequency spectrum swept by the RA. As shown in FIG. 1A, in one example, this filter is implemented as an finite impulse response (FIR) filter 188 executed by processor 182. In one example, bandwidth of passband of filter 188 is 100 MHz. In a further example, the bandwidth of the passband of filter 188 is in a range of 4.25 GHz and 4.35 GHz. FIGS. 2A and 2B depict an example of spectral chirps caused by the RA FMCW signal sweeping through allocated frequency spectrum as detected at baseband. FIG. 2A depicts the I-signal detected at baseband and FIG. 2B depicts the Q-signal detected at baseband. Each time the signal passes through the passband of filter 188, it produces an output from the filter in the form of a chirp that has a specific slope and duration. After the I-signal and the Q-signal is processed, the RA FMCW is characterized by determination of the RF signal's slope, slope magnitude, and period.

FIG. 3A is a magnified view of an example of spectral chirps from time t1 to t8 caused by the radio altimeter signal 132 sweeping through the bandwidth of filter 188. As seen in the example in FIG. 3A, a first chirp c1 is caused from time t1 to t2, a second chirp c2 is caused from time t3 to t4, a third chirp c3 is caused from time t5 to t6 and a fourth chirp c4 is caused from time t7 to t8. Chirps c1, c2, c3 and c4 are caused when the radio altimeter signal 132 is within the passband of filter 188.

The absolute slope of a chirp, such as chirp c1 for example, can be determined by the following equation 2:

$$\text{Absolute Slope} = \text{Bandwidth}/(t2-t1) \qquad (2)$$

where: t2−t1 is a difference between the point in time when the chirp begins (t1) and the point in time when the chirp ends (t2) and Bandwidth, is the bandwidth of the passband of filter 188. The calculated result m1 is the magnitude of the absolute slope of the reconstructed wave. The absolute slope of the reconstructed wave at other chirps c2, c3 and c4 is similarly calculated.

However, since a chirp is created every time the signal passes through the bandwidth of passband of filter 188 within the allocated frequency spectrum, the chirp could be created either when the signal 132 passes through the passband of the filter 188 as its frequency increases and the slope is positive, or when the signal passes through the passband of filter 188 as its frequency decreases and the slope is negative. This ambiguity in slope is shown by FIG. 3B. As shown in FIG. 3B, because of the slope ambiguity either a first wave 301 or a second wave 302, reverse of the wave 301 could be reconstructed using the absolute slope calculated in equation (2).

Figure 4A:
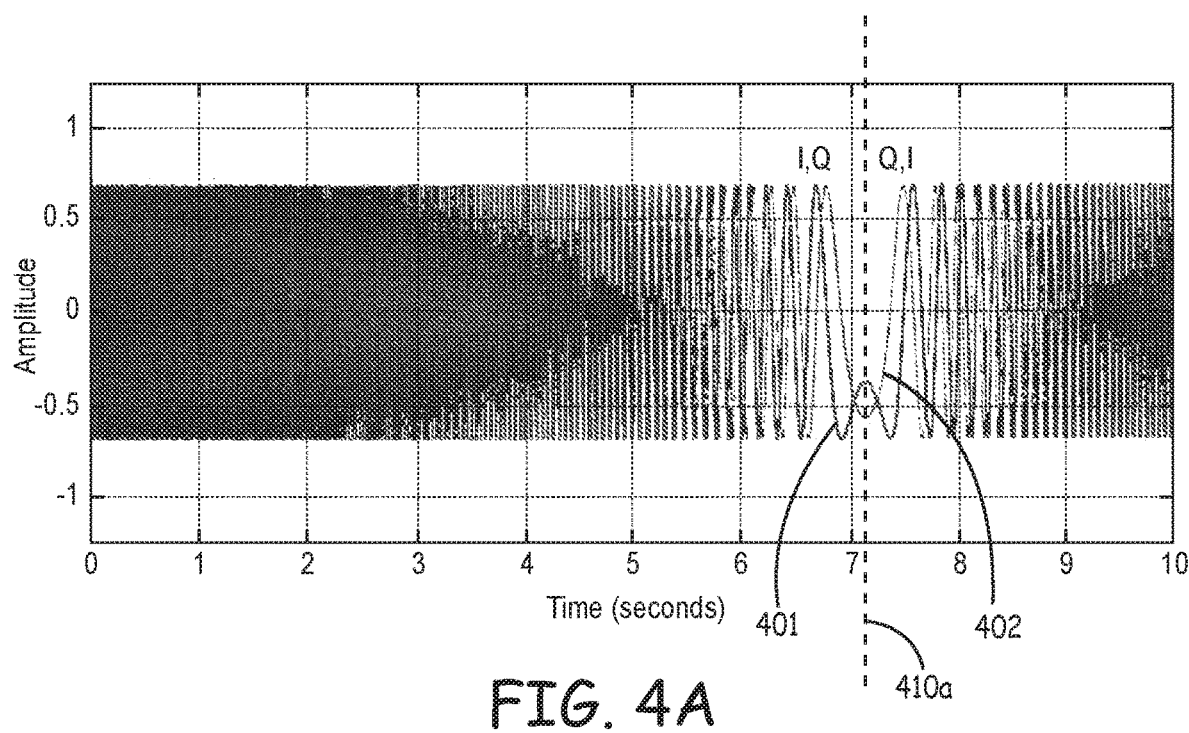
FIG. 4A is a graphical representation of down-converted I-signal and Q-signal in time domain of one embodiment of the present disclosure.

This slope ambiguity can be resolved by monitoring the frequency of signal 132 as it sweeps past passband midpoint 410a, the midpoint of the passband of filter 188. In one example, signal 132 sweeps past a local oscillator comprised within filter 188 and passband midpoint 410a is a zero point. FIG. 4A is a graphical representation of an example of the down-converted I-signal and the Q-signal as the frequency sweeps through filter 188. As shown in FIG. 4A, the sinusoid of I-signal 401 is leading the sinusoid of Q-signal 402 until the signals cross passband midpoint 410a. After passband midpoint 410a, sinusoid of Q-signal 402 is leading sinusoid of I-signal 401. Thus, the slope ambiguity can be resolved by monitoring the frequency of the detector as crosses the passband midpoint.

Figure 4B:
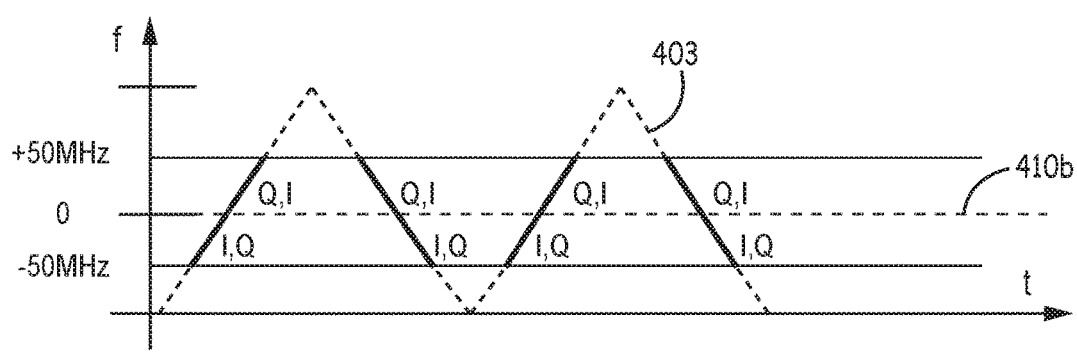
FIG. 4B is a graphical representation of an example of the reconstructed wave within the filter bandwidth of the allocated frequency spectrum of one embodiment of the present disclosure.

FIG. 4B is a graphical representation of an example of the reconstructed wave within the passband of the allocated frequency spectrum. The bandwidth of the passband in FIG. 4B is 100 MHz. In the example shown in FIG. 4B, the frequency wave is reconstructed using the signals shown in FIG. 4A. Accordingly, the passband midpoint 410a of FIG. 4A is the same as passband midpoint 410b shown in FIG. 4B. As shown in FIG. 4B, the slope of the reconstructed wave 403 is determined positive when the frequency switches from sinusoid of I-signal 401 leading to sinusoid of Q-signal leading after it crosses the passband midpoint 410b. Likewise, the slope of the reconstructed wave is determined negative when the frequency switches from sinusoid of Q-signal leading to I-signal leading after it crosses the passband midpoint 410b.

The period of the radio altimeter signal is the duration of time of one cycle of the signal after which the cycle of the signal will be repeated. As discussed above, a chirp could be created either when the signal passes through the passband as its frequency increases and the slope is positive, or when the signal passes through the passband as its frequency decreases and the slope is negative. Thus, the signal will chirp twice in one period: once, as the signal passes through the passband while its frequency is increasing and once, as the signal passes through the passband while its frequency is decreasing. Therefore, the period of the signal can be determined from the time the first chirp begins until the time the third chirp begins.

Referring back to the example of FIG. 3A, chirps c1, c2, c3 and c4 are generated by the radio altimeter signal 132 as the signal passes through the passband of filter 188 while sweeping through the allocated frequency spectrum. Chirps c1 and c3 have a positive slope and chirps c2 and c4 have a negative slope. Thus, one cycle of signal 132 extends from time t1, when the first chirp begins to time t5, when the third chirp begins and the cycle repeats. The period of the signal can be determined by the following equation 3:

$$\text{Period} = (t5-t1) = (t6-t2) = (t7-t3) = (t8-t4) \qquad (3)$$

where: t5–t1 is the difference between the point in time t5 when chirp c3 begins and the point in time t1 when chirp c1 begins. Similarly, the period can be determined by calculating the difference between the time t6 when chirp c3 ends and time t2 when chirp c1 ends, or the difference between time t7 when chirp c4 begins and time t3 when chirp c2 begins, or the difference between time t8 when chirp c4 ends and time t4 when chirp c2 ends.

FIG. 3C is a graphical representation of an example of reconstructed wave 303 created by the RA's FMCW signal as the signal sweeps through an allocated frequency spectrum within a passband 315 having a bandwidth within the allocated frequency spectrum. The allocated frequency spectrum in the example shown in FIG. 3C ranges from 4.2 GHz to 4.4 GHz. As shown in FIG. 3C, wave sections 304 are parts of the wave 303 within bandwidth 315. In one implementation, the example wave shown in FIG. 3C is reconstructed from the chirps shown in FIG. 3A.

As seen in FIGS. 3A-3C, wave sections 304 are reconstructed from the characteristics of their respective corresponding chirps. For example, in FIG. 3A, the frequency of the RF signal switches from sinusoid of I-signal leading to sinusoid of Q-signal leading after it crosses the passband midpoint 310-1. Accordingly, wave section 304-1 has a positive slope with a magnitude of m1 (calculated using equation (2)). Likewise, wave sections 304-2, 304-3, and 304-4 have the characteristics of chirps c2, c3 and c4 respectively.

Figure 5:
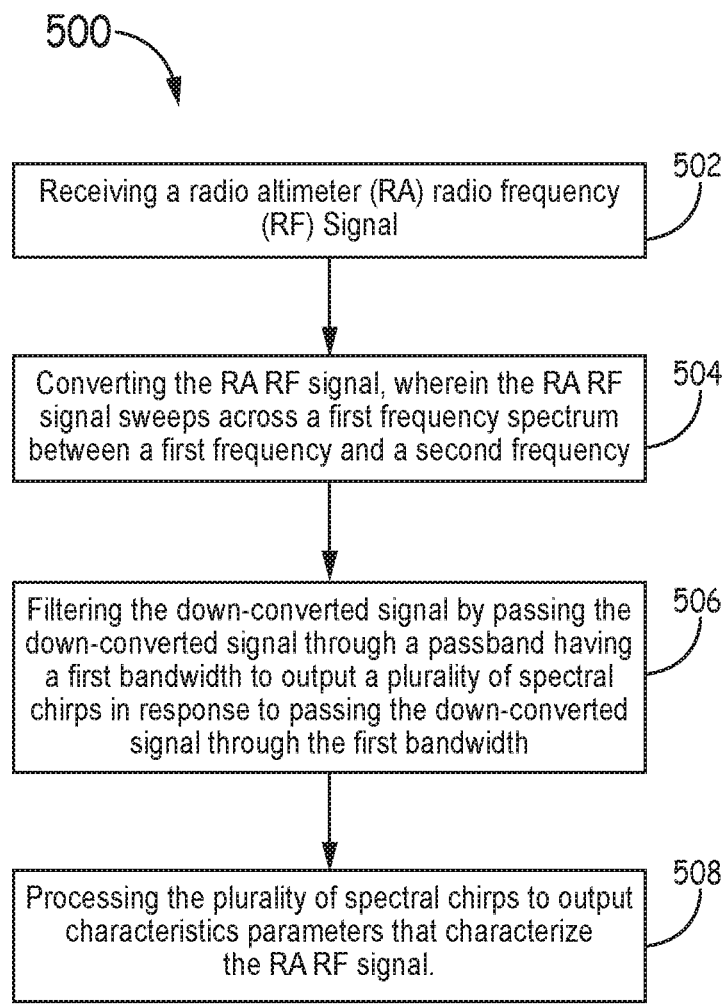
FIG. 5 is a flow chart illustrating a method of one embodiment of the present disclosure.

FIG. 5 is a flow diagram of an example method 500 of monitoring a frequency modulated continuous wave radio altimeter spectrum.

Method 500 begins at block 502 with receiving a radio altimeter (RA) radio frequency (RF) signal. Method 500 proceeds to block 504 with down-converting the received radio altimeter (RA) signal, wherein the RA RF signal sweeps across a first frequency spectrum between a first frequency and a second frequency. In some implementations, the received radio altimeter is converted to a baseband signal. In one example, converting a RA RF signal to a baseband signal further comprises direct down converting the RA RF signal. In one example, the RA RF signal is down converted using a RF agile transceiver. In some examples, the RF agile transceiver can operate in a band ranging from 4.2 GHz to 4.4 GHz inclusive.

Method 500 proceeds to block 506 with filtering the down-converted signal by passing the down-converted signal through a filter with a passband having a first bandwidth to output a plurality of spectral chirps in response to passing the down-converted signal through the first bandwidth. In one example, filtering the down-converted signal further comprises passing the down-converted signal through a passband having a first bandwidth of 100 MHz. In a further example, the first bandwidth ranges from 4.25 GHz to 4.35 GHz.

Method 500 proceeds to block 508 with processing the plurality of spectral chirps to output characteristic parameters that characterize the RA RF signal. In one example, processing the plurality of spectral chirps further comprises calculating a first characteristic parameter comprising a period of the RA RF signal, calculating a second characteristic parameter comprising an absolute slope of the RA RF signal, and calculating a third characteristic parameter comprising a magnitude of the absolute slope, wherein the magnitude of the absolute slope is determined based on a relative phase difference between the in-phase component and the quadrature-phase component of the down-converted signal.

In one example of method 500, calculating the first characteristic parameter further comprises determining the absolute slope as a function of division of a first difference between a first point in time and a second point time by the filter bandwidth, wherein the first point in time is time when a respective chirp begins and the second point in time is time when the respective chirp ends. In an example of method 500, calculating the second characteristic further comprises determining the period is a second difference between a first point in time and a third point in time, wherein the first point in time is when a first chirp begins and the third point in time is when a second chirp begins, wherein the first chirp and the second chirp have the same slope. In one example, calculating a third characteristic further comprises determining magnitude of the absolute slope as positive when the I-signal's sinusoid is leading the Q-signal's sinusoid before a passband midpoint and the Q-signal's sinusoid is leading an I-signal's sinusoid after the passband midpoint, and determining the slope as negative when the Q-signal's sinusoid is leading the I-signal's sinusoid before a passband midpoint and the I-signal's sinusoid is leading the Q-signal's sinusoid after the passband midpoint. In one example, method 500 further comprises communicating the characteristic parameters to one or more avionics components.

Example Embodiments

Example 1 includes a radio altimeter tracking filter, the filter comprising: a wireless radio interface; a processor coupled to a memory; wherein the wireless radio interface is configured to wirelessly receive a radio altimeter signal and convert the radio altimeter signal to a baseband frequency signal, wherein the a radio altimeter signal sweeps across a first frequency spectrum between a first frequency and a second frequency; wherein the processor is configured to pass the baseband frequency signal through a filter executed by the processor, the filter comprising a passband having a first bandwidth, and wherein the filter outputs a plurality of spectral chirps in response to the baseband frequency signal passing through the first bandwidth; wherein the processor is configured to process the plurality of spectral chirps to output characteristic parameters that characterize the radio altimeter signal.

Example 2 includes the filter of Example 1, wherein the baseband frequency signal comprises in-phase (I) component and a quadrature-phase (Q) component; wherein the processor calculates: a first characteristic parameter comprising a period of the radio altimeter signal; a second characteristic parameter comprising an absolute slope of the radio altimeter signal; and a third characteristic parameter comprising a magnitude of the absolute slope, wherein the magnitude of the absolute slope is determined based on a relative phase difference between the in-phase component and the quadrature-phase component of the baseband frequency signal.

Example 3 includes the filter of Example 2, wherein the slope is defined as positive when the I-phase component leads Q-phase component before the baseband frequency signal crosses a passband midpoint and the Q-phase component is leading the I-phase component after the passband midpoint, and wherein the slope is defined as negative when Q-phase component is leading the I-phase component before a passband midpoint and the -phase component is leading the Q-phase component after the passband midpoint.

Example 4 includes the filter of any of Examples 2-3, wherein the absolute slope is a result of division of a first difference between a first point in time and a second point time by the first bandwidth, wherein the first point in time is time when a respective chirp begins and the second point in time is time when the respective chirp ends.

Example 5 includes the filter of any of Examples 2-4, wherein the period is a second difference between a first point in time and a third point in time, wherein the first point in time is when a first chirp begins and the third point in time is when a second chirp begins, wherein the first chirp and the second chirp have the same slope.

Example 6 includes the filter of any of Examples 1-5, wherein the wireless radio interface further comprises a receiver or transceiver able to operate over the first frequency spectrum.

Example 7 includes the filter of any of Examples 1-6, wherein the wireless radio interface comprises an RF Agile Transceiver capable of operating in the first frequency spectrum.

Example 8 includes the filter of any of Examples 1-7, wherein the first frequency spectrum is Aeronautical Radio Navigation Band ranging from Example 4.2 GHz to any of Examples 4-7.4 GHz.

Example 9 includes the filter of any of Examples 1-8, wherein the wireless radio interface further comprises an analog-to-digital converter and a digital down converter.

Example 10 includes the filter of any of Examples 1-9, wherein the first bandwidth is 100 MHz and ranges from Example 4.25 GHz to any of Examples 4-9.35 GHz.

Example 11 includes the filter Example 1, wherein the processor is further configured to communicate characteristic parameters to one or more avionics components coupled to the filter.

Example 12 includes the avionics system of any of Examples 1-11, wherein the baseband frequency signal is a triangle wave.

Example 13 includes a method of monitoring radio altimeter spectrum in an avionics system, the method comprising: receiving a radio altimeter (RA) radio frequency (RF) signal; converting the RA RF signal, wherein the RA RF signal sweeps across a first frequency spectrum between a first frequency and a second frequency; filtering the down-converted signal by passing the down-converted signal through a passband having a first bandwidth to output a plurality of spectral chirps in response to passing the down-converted signal through the first bandwidth; and processing the plurality of spectral chirps to output characteristic parameters that characterize the RA RF signal.

Example 14 includes the method of Example 14, wherein converting the RA RF signal further comprises converting the RA RF signal to a baseband frequency signal.

Example 15 includes the method of any of Examples 13-14, wherein processing the plurality of spectral chirps further comprises: calculating a first characteristic parameter comprising a period of the RA RF signal; calculating a second characteristic parameter comprising an absolute slope of the RA RF signal; and calculating a third characteristic parameter comprising a magnitude of the absolute slope, wherein the magnitude of the absolute slope is determined based on a relative phase difference between an in-phase (I) component and a (Q) quadrature-phase component of the down-converted signal.

Example 16 includes the method of Example 15, wherein calculating a third characteristic further comprises determining magnitude of the absolute slope as positive when the I-signal's sinusoid is leading the Q-signal's sinusoid before a passband midpoint and the Q-signal's sinusoid is leading an I-signal's sinusoid after the passband midpoint, and determining the slope as negative when the Q-signal's sinusoid is leading the I-signal's sinusoid before a passband midpoint and the I-signal's sinusoid is leading the Q-signal's sinusoid after the passband midpoint.

Example 17 includes the method of any of Examples 15-16, wherein calculating the first characteristic parameter further comprises determining the absolute slope is a result of division of a first difference between a first point in time and a second point time by the filter bandwidth, wherein the first point in time is time when a respective chirp begins and the second point in time is time when the respective chirp ends.

Example 18 includes the method of any of Examples 15-17, wherein calculating the second characteristic further comprises determining the period is a second difference between a first point in time and a third point in time, wherein the first point in time is when a first chirp begins and the third point in time is when a second chirp begins, wherein the first chirp and the second chirp have the same slope.

Example 19 includes a wireless communication system, the system comprising: a plurality of device nodes aboard an aircraft that share a radio frequency spectrum using time-division multiple access (TDMA); a radio altimeter tracking filter configured to output characteristic parameters characterizing a radio altimeter signal transmitted by a radio altimeter aboard the aircraft; a timeslot allocation function coupled to the radio altimeter tracking filter, wherein the timeslot allocation function allocates timeslots to channels within the radio frequency spectrum based on the characterization parameters; wherein the radio altimeter tracking filter is configured to wirelessly receive the radio altimeter signal and convert the radio altimeter signal to a baseband frequency signal, wherein the a radio altimeter signal sweeps across the radio frequency spectrum between a first frequency and a second frequency; wherein the radio altimeter tracking filter implements a filter comprising a passband having a first filter bandwidth, wherein the filter outputs a plurality of spectral chirps in response to the baseband frequency signal passing through the first bandwidth; wherein the radio altimeter tracking filter is configured to process the plurality of spectral chirps to output the characteristic parameters that characterize the radio altimeter signal.

Example 20 includes the system of Example 19, wherein there baseband frequency signal comprises in-phase (I) component and a quadrature-phase (Q) component; wherein the characteristic parameters comprise at least: a first characteristic parameter comprising a period of the radio altimeter signal; a second characteristic parameter comprising an absolute slope of the radio altimeter signal; and a third characteristic parameter comprising a magnitude of the absolute slope, wherein the magnitude of the absolute slope is determined based on a relative phase difference between the in-phase component and the quadrature-phase component of the baseband frequency signal.

In various alternative embodiments, system elements, method steps, or examples described throughout this disclosure (such as the wireless avionics devices, Wireless Avionics Timeslot Allocation Function, Radio Altimeter Tracking Filter, or sub-parts thereof, for example) may be implemented using one or more computer systems, field programmable gate arrays (FPGAs), or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A radio altimeter tracking filter, the filter comprising:
    a wireless radio interface configured to wirelessly receive a radio altimeter signal and convert the radio altimeter signal to a baseband frequency signal, wherein the radio altimeter signal sweeps across a first frequency spectrum between a first frequency and a second frequency;
    a processor communicatively coupled to the wireless radio interface, the processor configured to:
        pass the baseband frequency signal through a filter executed by the processor, the filter comprising a passband having a first bandwidth;
        output, by the filter, a plurality of spectral chirps in response to the baseband frequency signal passing through the first bandwidth, each chirp having a slope and duration;
        calculate characteristic parameters of the received radio altimeter signal based on the plurality of spectral chirps, the characteristic parameters including: a period of the radio altimeter signal, an absolute slope of the radio altimeter signal, and a magnitude of the absolute slope; and
        predict a future frequency of the radio altimeter signal based on the calculated characteristic parameters of the received radio altimeter signal.

2. The filter of claim 1, wherein the baseband frequency signal comprises in-phase (I) component and a quadrature-phase (Q) component;
    wherein the magnitude of the absolute slope is determined based on a relative phase difference between the I-phase component and the Q-phase component of the baseband frequency signal.

3. The filter of claim 2, wherein the slope is defined as positive when the I-phase component leads Q-phase component before the baseband frequency signal crosses a passband midpoint and the Q-phase component is leading the I-phase component after the passband midpoint, and wherein the slope is defined as negative when Q-phase component is leading the I-phase component before a passband midpoint and the -phase component is leading the Q-phase component after the passband midpoint.

4. The filter of claim 2, wherein the absolute slope is a result of division of a first difference between a first point in time and a second point time by the first bandwidth, wherein the first point in time is time when a respective chirp begins and the second point in time is time when the respective chirp ends.

5. The filter of claim 2, wherein the period is a second difference between a first point in time and a third point in time, wherein the first point in time is when a first chirp begins and the third point in time is when a second chirp begins, wherein the first chirp and the second chirp have the same slope.

6. The filter of claim 1, wherein the wireless radio interface further comprises a receiver or transceiver able to operate over the first frequency spectrum.

7. The filter of claim 1, wherein the wireless radio interface comprises an RF Agile Transceiver capable of operating in the first frequency spectrum.

8. The filter of claim 1, wherein the first frequency spectrum is Aeronautical Radio Navigation Band ranging from 4.2 GHz to 4.4 GHz.

9. The filter of claim 1, wherein the wireless radio interface further comprises an analog-to-digital converter and a digital down converter.

10. The filter of claim 1, wherein the first bandwidth is 100 MHz and ranges from 4.25 GHz to 4.35 GHz.

11. The filter of claim 1, wherein the processor is further configured to communicate the predicted future frequency of the radio altimeter signal to one or more avionics components coupled to the filter.

12. The filter of claim 1, wherein the baseband frequency signal is a triangle wave.

13. A method of monitoring radio altimeter spectrum in an avionics system, the method comprising:
    receiving a radio altimeter (RA) radio frequency (RF) signal;
    down-converting the RA RF signal, wherein the RA RF signal sweeps across a first frequency spectrum between a first frequency and a second frequency;
    filtering the down-converted RA RF signal by passing the down-converted RA RF signal through a passband filter having a first bandwidth to output a plurality of spectral chirps in response to passing the down-converted signal through the first bandwidth;
    processing the plurality of spectral chirps to output characteristic parameters that characterize the RA RF signal, wherein processing the plurality of spectral chirps includes:
        calculating a first characteristic parameter comprising a period of the RA RF signal;
        calculating a second characteristic parameter comprising an absolute slope of the RA RF signal; and
        calculating a third characteristic parameter comprising a magnitude of the absolute slope; and
    predicting a future frequency of the RA RF signal based on the calculated first, second, and third characteristic parameters.

14. The method of claim 13, wherein down-converting the RA RF signal further comprises converting the RA RF signal to a baseband frequency signal.

15. The method of claim 13, wherein the magnitude of the absolute slope is determined based on a relative phase difference between an in-phase (I) component and a quadrature-phase (Q) component of the down-converted signal.

16. The method of claim 15, wherein calculating the third characteristic further comprises determining magnitude of the absolute slope as positive when the I-signal's sinusoid is leading the Q-signal's sinusoid before a passband midpoint and the Q-signal's sinusoid is leading an I-signal's sinusoid after the passband midpoint, and determining the slope as negative when the Q-signal's sinusoid is leading the I-signal's sinusoid before a passband midpoint and the I-signal's sinusoid is leading the Q-signal's sinusoid after the passband midpoint.

17. The method of claim 15, wherein calculating the first characteristic parameter further comprises determining the absolute slope is a result of division of a first difference between a first point in time and a second point time by the filter bandwidth, wherein the first point in time is time when a respective chirp begins and the second point in time is time when the respective chirp ends.

18. The method of claim 15, wherein calculating the second characteristic further comprises determining the period is a second difference between a first point in time and a third point in time, wherein the first point in time is when a first chirp begins and the third point in time is when a second chirp begins, wherein the first chirp and the second chirp have the same slope.

19. A wireless communication system, the system comprising:
 a plurality of device nodes aboard an aircraft that share a radio frequency spectrum using time-division multiple access (TDMA);
 a radio altimeter tracking filter configured to output characteristic parameters characterizing a radio altimeter signal transmitted by a radio altimeter aboard the aircraft; and
 a timeslot allocation function coupled to the radio altimeter tracking filter, wherein the timeslot allocation function allocates timeslots to channels within the radio frequency spectrum based on the characterization parameters;
 wherein the radio altimeter tracking filter is configured to wirelessly receive the radio altimeter signal and convert the radio altimeter signal to a baseband frequency signal, wherein the a radio altimeter signal sweeps across the radio frequency spectrum between a first frequency and a second frequency;
 wherein the radio altimeter tracking filter implements a filter comprising a passband having a first filter bandwidth, wherein the filter outputs a plurality of spectral chirps in response to the baseband frequency signal passing through the first bandwidth; and
 wherein the radio altimeter tracking filter is configured to process the plurality of spectral chirps to output the characteristic parameters that characterize the radio altimeter signal.

20. The system of claim 19, wherein the baseband frequency signal comprises in-phase (I) component and a quadrature-phase (Q) component;
 wherein the characteristic parameters comprise at least:
  a first characteristic parameter comprising a period of the radio altimeter signal;
  a second characteristic parameter comprising an absolute slope of the radio altimeter signal; and
  a third characteristic parameter comprising a magnitude of the absolute slope, wherein the magnitude of the absolute slope is determined based on a relative phase difference between the in-phase component and the quadrature-phase component of the baseband frequency signal.

* * * * *